United States Patent [19]

Goutzoulis et al.

[11] Patent Number: 5,739,938
[45] Date of Patent: Apr. 14, 1998

[54] OPTICALLY-POWERED DIRECTLY-MODULATED FIBER OPTIC LINK

[75] Inventors: Akis P. Goutzoulis, Pittsburgh; John M. Zomp, N. Huntingdon, both of Pa.

[73] Assignee: Northrop Grumman Corporation, Los Angeles, Calif.

[21] Appl. No.: 711,566

[22] Filed: Sep. 10, 1996

[51] Int. Cl.$^6$ .................................................. H04B 10/04
[52] U.S. Cl. ........................... 359/187; 359/171; 359/173; 372/38
[58] Field of Search ........................... 359/161, 171, 359/173, 187; 372/38; 250/214 A, 214 LA

[56] References Cited

U.S. PATENT DOCUMENTS 5,448,629  9/1995  Bosch et al. .......................... 359/187
5,528,409  6/1996  Cucci et al. .......................... 359/171

OTHER PUBLICATIONS

An Analytic and Experimental Comparison of Direct and External Modulation in Analog Fiber–Optic Links;C.H. Cox III, G.E. Betts, L.M. Johnson; 1990.
Comparative evaluation of optical and conventional approaches for array antenna beamforming;R.P. Gouse, A.P. Goutzoulis, 1995.
An Analytical Comparison between Direct and External Modulation for Long–Haul Fiber Optic Antenna Remoting;R. Merrill, G. Pugmire, 1993.
Photonics technology and the implementation into solid state phased arrays; James M. Howell and Michael G. Sarcoine; 1992.
Architectures and Performance of Laser Links in Microwave Phased–Array Antenna Systems; D.L. Baldwin and A.G. Garas; 1990.
EHF Fiber Optic–Based Antenna Array; H.W. Yen, M. Wechsberg, J.J. Lee, and A.E. Popa; 1988.
Optical Techniques for signal Distribution and Control in Phased Array Radars; J. Forrest, R. Richards, E. Esdale, D. Wight, P. Beharrell; 1985.
Optical Techniques to Feed and Control GaAs MMIC Modules for Phased Array Antenna Applications; K. Bhasin, G. Anzic, R. Kunath, D. Connelly; 1986.
Optically Controlled Remote Modulator; P. Eumurian, D. Snyder; 1994.

Primary Examiner—Kinfe-Michael Negash
Attorney, Agent, or Firm—Walter G. Sutcliff

[57] ABSTRACT

A fiber optic transmitter having a directly modulated laser diode for transmitting a modulated optical signal, a pin diode for providing a pin diode monitor current representing the output power of the laser diode, an optical power source for receiving an optical signal and providing an electrical signal, a power regulator for providing a laser diode driver current which varies with the pin diode monitor current, an amplifier for receiving an RF signal and providing an amplified RF signal to the laser diode, where the laser diode driver current directly modulates the laser diode and biases the transistor in the amplifier.

23 Claims, 3 Drawing Sheets

OPTICALLY-POWERED DIRECTLY-MODULATED FIBER OPTIC LINK

FIELD OF THE INVENTION

The present invention relates, generally, to fiber optic transmitters and, more specifically, to fiber optic transmitters having a laser diode, a pin diode, an optical power source, a power regulator and an amplifier with one or more transistors.

BACKGROUND OF THE INVENTION

Prior art fiber optic transmission systems may be used to transmit a radio frequency signal over a fiber optic cable. Generally, prior art fiber optic transmission systems include a fiber optic transmitter for receiving an RF signal and converting the RF signal into an optical signal, a fiber optic receiver for receiving the optical signal, and a fiber optic cable connecting the fiber optic transmitter with the fiber optic receiver which provides a means for carrying the transmitted optical signal from the fiber optic transmitter to the fiber optic receiver. Compared to conventional coaxial type transmission systems, fiber optic transmission systems are low volume, light weight, and offer zero crosstalk from adjacent transmission systems.

Because of these advantages, fiber optic transmission systems have been considered for phased array antenna manifolds for radar and other applications. Weight, volume and crosstalk are especially critical parameters in phased array antenna manifolds for airborne and space-based platforms. In addition, it is desirable that the phased array antenna manifolds in airborne and space-based platforms consume low power without compromising the low noise figure and the high spurious free dynamic range of the overall system.

Fiber Optic Transmitters

Prior art fiber optic transmitters, generally, have an amplifier for amplifying an RF signal, a laser module for receiving the amplified RF signal and transmitting an optical signal, and a power source for providing power signals to the amplifier and the laser module.

The laser module may have a direct or an external modulation scheme for modulating the optical signal. The direct modulation scheme may include a laser diode that receives a laser driving signal and an RF signal and generates a modulated optical signal where the laser driving signal is directly modulated by the RF signal. The external modulation scheme includes a laser diode for receiving a laser driver signal and for generating an optical signal and a modulator for modulating the optical signal.

As stated above, volume, weight and power are critical parameters of space-base and airborne platforms. Ideally these platforms would consume low power and have one power source which distributes power to the various components of the platform. Providing a power source for each component of the platform would increase the weight and the volume and is therefore undesirable. Decreasing the power consumption of the various components is desirable because the size and weight of the power source would also decrease.

It is also desirable for the distribution system, which distributes power to the various component of the platform, to be small in volume and weight. To this end, minimizing the number of distributing lines and decreasing the weight of each distributing line is desirable. Furthermore, it is desirable to increase the transmission efficiency of the distributing lines such that very little of the power transmitted over the distribution lines is lost due to resistivities and inefficient connections thereby decreasing the amount of power transmitted by the power source and thus decreasing the size and weight thereof.

It is desirable for the distributing lines to be fiber optic cable because compared to convention copper cable, fiber optic cable is lighter in weight and volume.

Known prior art fiber optic transmitters are supplied with power from a power source over a distribution line, however, the distribution line is a conventional non-fiber optic cable which adds weight and therefore is undesirable.

Accordingly, one object of this invention is a fiber optic transmission system having a fiber optic transmitter that consumes low power without compromising the noise figure and the high spurious free dynamic range of the system.

Another object of this invention is a fiber optic transmitter having one power signal for driving the laser diode and for biasing the amplifier.

Still another object of this invention is to provide a fiber optic transmitter that is powered by an optical signal.

DETAILED DESCRIPTION OF INVENTION

Figure 1:
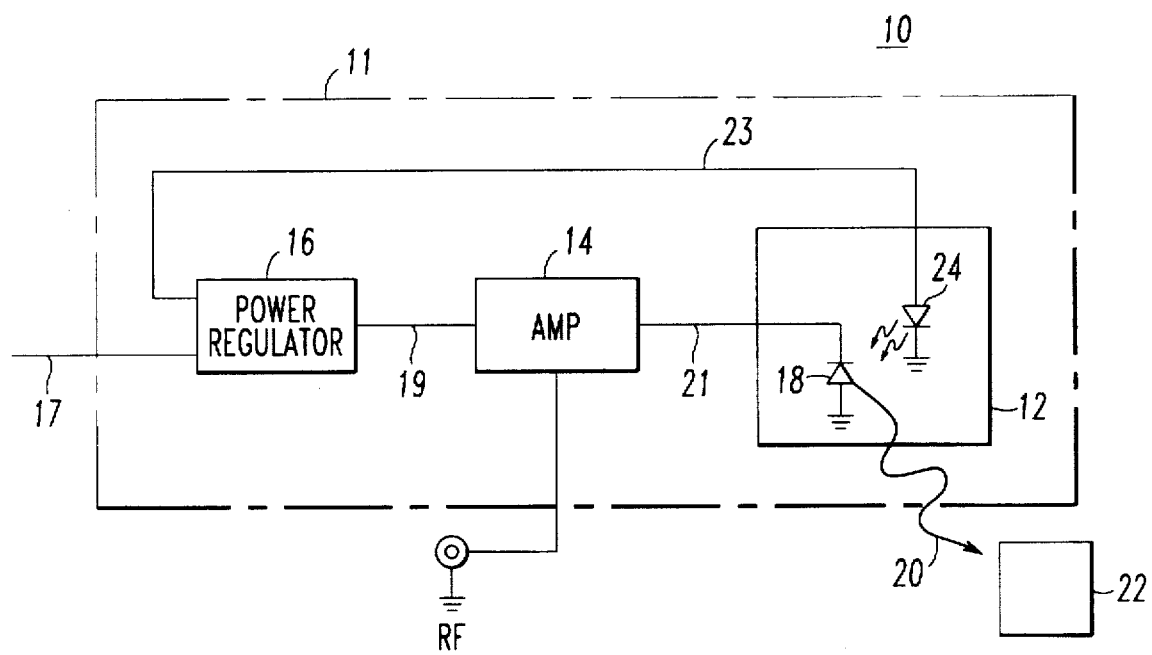
FIG. 1 is a block diagram of one embodiment of the fiber optic transmitter of the present invention.

FIG. 1 is a block diagram of the present invention. Referring to FIG. 1, the fiber optic transmission system 10 of the present invention includes, generally, a fiber optic transmitter 11 and a fiber optic receiver 22. The fiber optic transmitter 11 generally includes a laser module 12, an amplifier 14 and a power regulator 16. The laser module 12 includes a laser diode 18 driven by the RF signal from the amplifier 14 and transmitting a modulated laser signal to the fiber optic receiver 22 over fiber optic cable 20, and a pin diode 24 for monitoring the output power of the laser diode 18. The pin diode 24 generates a pin diode current which is representative of and varies with the laser diode output power. Because the laser diode output power may vary with changes in temperature, the pin diode current may change with temperature.

The power regulator 16, generally, receives DC optical power signal 17 and the pin diode current 23 and provides a regulated laser diode driver current 19 which varies with the pin diode current 23. The laser diode driver current 19 is for driving the laser diode 18 and for biasing the amplifier 14 thereby eliminating the need for a second power signal to bias the amplifier. The amplifier 14 receives an RF signal and outputs an amplified RF signal and the laser diode driver current at the amplifier output 21 for transmission to the laser diode 18 of the laser module 12. Because the pin monitor current 23 varies with the temperature and output power of the laser diode 18, the laser diode driver current 19 also varies with the temperature and output power of the laser diode 18 such that the output power of the laser diode 18 remains constant despite temperature changes.

As described above, the fiber optic transmission system 10 includes a fiber optic transmitter 11 having an operating current between about 35 and 50 milliamps and an operating voltage less than about 4.2 volts, while the system maintains a noise figure below about 2.5 dB and a high spurious free dynamic range greater than about 70 dB/MHz.

Figure 2:
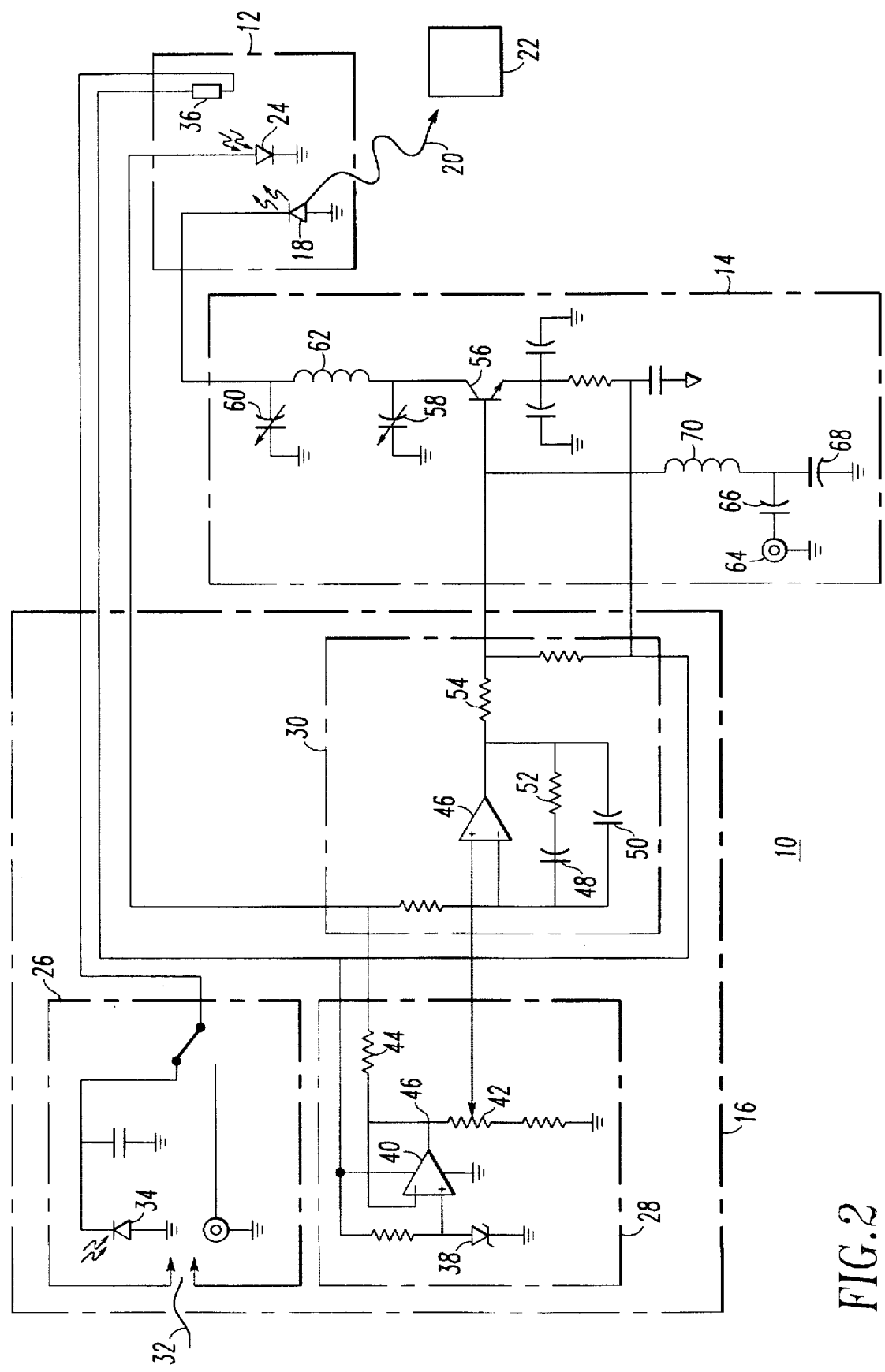
FIG. 2 is a circuit diagram of one embodiment of the fiber optic transmitter of the present invention.

FIG. 2 shows a first embodiment of the fiber optic transmission system of the present invention. Referring to FIG. 2 the fiber optic transmission system 10 includes: the laser module 12 with the laser diode 18 and the pin diode 24 and a thermolectric cooler 36; the amplifier 14; and the power regulator 16 which includes an optical-to-electrical converter circuit 26, a reference circuit 28, and an optical power regulator 30.

The laser diode 18 receives an RF signal from the amplifier 14 and provides a modulated laser signal which is transmitted over a fiber optic cable 20 to the fiber optic receiver 22. The output power of the laser diode 18 varies with the temperature of the laser diode 18. The pin diode 24 monitors the output power of the laser diode 18 and provides a pin monitor current which varies with the output power of the laser diode 18 and thus the temperature of the laser diode 18. The laser diode 18, can be any laser diode whose RF characteristics satisfy the application requirements.

The optical-to-electrical converter circuit 26 includes a fiber optic cable 32 for transmitting an optic power signal to an optic power converter 34 which converts the optic power signal into an electric power signal. While the optic power converter 34 can be any optic power converter known in the art which converts an optic power signal into an electric power signal, a gallium arsenide photocell array is preferred. The photocell array may operate over a wide optical bandwidth preferably between about 770–870 nm and may produce up to a −6 v unregulated power signal.

Furthermore, the fiber optic cable 32 interfaces the optic power converter via a fiber optic connector. The fiber optic cable 32 may be a multi mode fiber cable as is well known in the art. In order to minimize the magnitude of the optic power signal while maximizing the magnitude of the electric power signal, the fiber optic connector must be angle polished in order to direct the light from the fiber optic cable 32 to the most sensitive portions of the photocell array of the optic power converter 34.

For example, the fiber optic transmitter 10 may require an electronic power signal of 60 milliamps at 4 volts. To achieve this, the photocell array of the optic power converter 34 must be illuminated by about 1 watt of optical power. The photocell array may be a circular, 3 mm diameter array having an inactive center area of about 200 mm. Most fiber optic cables emit light concentrated at the center. When interfaced with a photocell array, the fiber optic cable concentrates light at the center of the photocell array, which is for the most part inactive, thereby creating an inefficient conversion of the optic power signal into an electronic power signal. The inefficiency may be overcome by increasing the optical power signal which is undesirable because of the increased costs associated with high power laser arrays. Alternatively, by angle polishing the fiber optic connector, the light emitted from the fiber optic cable is concentrated on the outer perimeter of the photocell array, instead of the center, thereby producing a greater electronic power signal for a given optic power signal.

The required polishing angle is about 7–10 degrees and can be accomplished with commercially available fiber polishers. The fiber optic cable must be polished with at least three angular polishings, one every 120 degrees. The light emitted from the polished fiber optic cable will have a profile of three partially overlapping spots which are offset from the 200 micrometer diameter of the center of the photocell array.

The amount of offsetting is determined by the polishing angle. The higher the polishing angle the more the offset. By increasing the number of angular polishings, the efficiency of the fiber optic cable to photocell array increases.

The electronic power signal is transmitted from the optic power converter 34 to the reference circuit 28. As indicated above the electronic power signal is preferably between about 30 and 50 milliamps at about 4.2 volts. The reference circuit 28 receives the electric power signal and provides a regulated DC voltage of a predetermined value. In a preferred embodiment the regulated DC voltage is −2.5 volts.

Still referring to FIG. 2, the reference circuit 28 may include a reference diode 38 for providing a reference voltage, an operational amplifier 40 for buffering the reference voltage to thereby provide an output voltage at an output terminal 46, a source resistor 42 for providing a regulated DC voltage, and a stabilizing resistor 44 for receiving the pin diode current to thereby generate a stabilizing voltage. In the preferred embodiment the reference diode 38 is a 2.5 volt reference diode biased at about 75 micro amps and the operational amplifier 40 provides a −2.5 v at the output terminal 46. The value of the stabilizing resistor 44 must be selected based upon the relationship between the specific pin diode 24 and the specific laser diode 18 selected. In the preferred embodiment, the stabilizing resistor 44 is equal to 1.25 divided by the pin diode current when the output power of the laser diode 18 is at a desired maximum level.

The optical power regulator 30 includes an operational amplifier 46 for producing a laser diode driver current and a damping circuit comprised of a first capacitor 48, a second capacitor 50, a first resistor 52 and a second resistor 54. The operational amplifier 46 includes an inverting terminal connected to the source voltage and a noninverting terminal connected to the stabilizing voltage. In this configuration, the laser diode driver current at the output of the operational amplifier 46 is increased to the point where the stabilizing voltage is equal to the source voltage which in the preferred embodiment is −2.5 V.

The amplifier 14 is a single stage amplifier and may include a transistor 56, a collector impedance matching network for matching the impedance of the transistor collector with the laser diode 18 and a base impedance matching network for matching the impedance of the transistor base with the RF input terminal 64. The collector impedance matching network includes a first shunt capacitor 58, a second shunt capacitor 60 and a series inductor 62. The values of the shunt capacitors and the series inductor vary with different laser diode types. Generally, the value of the first shunt capacitor 58 is between about 0.5–2 pico farads, the value of the second shunt capacitor 60 is between about 2–6 picofarads and the value of the series inductor 62 is about 90 nanohenries. The base impedance matching network includes a series capacitor 66, a shunt capacitor 68 and a series inductor 70. Generally, the value of the shunt capacitor 68 is between about 0.5–2 pico farads, the value of the series capacitor 66 is between about 2–6 picofarads and the value of the series inductor 70 is about 90 nanohenries.

The laser diode driver current from the optic power regulator 30 is applied to the base of the transistor 56 for biasing the transistor 56. The laser diode driver current then passes to the laser diode 18 for driving the laser diode. The amplifier 14 also receives an RF signal at an RF terminal 64 which is passed by the transistor 56 to the laser diode 18 where the RF signal modulates the laser diode 18. In this way, the laser diode driver current serves the dual purpose of biasing the transistor 56 and driving the laser diode 18 thereby eliminating the need for a separate power source to bias the transistor 56.

Figure 3:
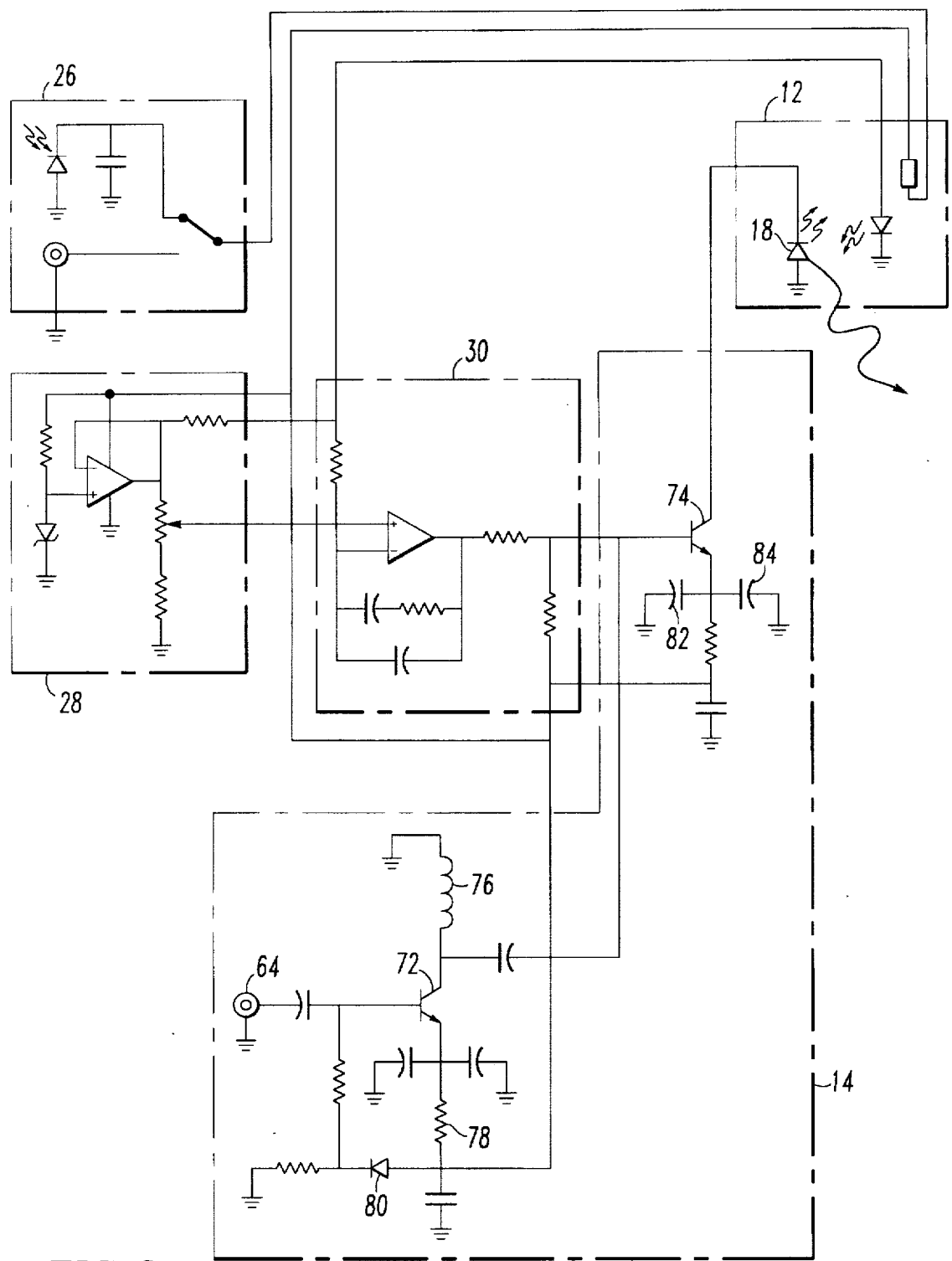
FIG. 3 is a circuit diagram of one embodiment of the fiber optic transmitter of the present invention.

A second embodiment of the amplifier of the fiber optic transmission system of the present invention is shown in FIG. 3. Referring to FIG. 3, the circuit is identical to the circuit shown in FIG. 2 with the exception of the amplifier 14. As shown in FIG. 3, the amplifier may include a first amplifier stage having a first transistor 72 and a second amplifier stage having a second transistor 74.

The first transistor is coupled to an RF input terminal 64 and is in a common emitter configuration using an inductor 76 as a collector load. The electronic power is applied to the emitter through resistor 78. The current is regulated with a reference diode which sets the base voltage at a voltage 2.5 volts greater than the electronic DC signal. Therefore, the voltage across emitter resistor 78 remains constant even though the electronic power signal varies. The emitter resistor is chosen to provide a collector current slightly above what is necessary to achieve the third order intercept point necessary for the required spurious free dynamic range. In the preferred embodiment, the emitter resistor is set so that the collector current is about 10 milliamps. In the preferred embodiment, the transistor gain is about 20 dB and the noise figure is less than about 2 dB. In this configuration the gain variation and tilt over the band of interest is less than about 0.5 dB.

The second transistor 74 uses the laser diode driver current from the optic power regulator as a bias current. The laser diode driver current passes to the laser diode 18 to thereby drive the laser diode 18 whereby the need for a separate power supply to bias the second transistor 74 is eliminated. The RF signal from the first transistor 72 is AC coupled to the second transistor 74 in a common emitter configuration with the emitter held at AC zero by a first capacitor 82 and a second capacitor 84 which preferably have a value of 0.1 micro farads. The RF signal is passed to the laser diode 18 and modulates the laser diode 18. The second transistor 74 requires a third order intercept much higher than the first transistor 72 and thus a higher collector current. The second transistor 74 provides an additional gain of about 15 dB which in combination with the first transistor 72 provides an overall system noise figure less than about 2 dB and a overall system gain variation and tilt less than about 1 dB. In the dual transistor embodiment, the first and second transistors may have an Ft of 12 and 6 Ghz, respectively.

The single stage amplifier has advantages and disadvantages over the dual stage amplifier. For example, the single stage configuration uses less power, however, it requires matching networks. Tuning of the matching networks requires a compromise between gain and bandwidth. Higher gains require more peaking of the response over the band of interest. Experiments with Mitsubishi laser diodes showed less than 1 dB of peaking at the center frequency with enough gain to achieve the required noise figure.

As an example only, the above described device has been implemented over a 360–380 Mhz band with a noise figure of about 2.4 dB, a spurious free dynamic range of about 71 dB/Mhz, and an operating voltage of about 4.2 volts at between about 40–60 ma.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What we claim is:

1. An optically powered, directly modulated, fiber optic link having a fiber optic transmitter and a fiber optic receiver, said fiber optic transmitter comprising:
   a laser transmit module having,
      a directly modulated laser diode for transmitting a modulated laser signal over a fiber optic cable, said laser diode having a laser diode output power which may vary with temperature changes of the laser diode, and
      a pin diode for monitoring the laser diode output power and producing a pin diode current which varies with the laser diode output power and thus the temperature of the laser diode;
   an optical power source having a fiber optic cable for transmitting an optic power signal and an optical power converter connected to an end of said fiber optic cable for receiving said input optical power signal and producing an electric power signal;
   a reference circuit for receiving the electric power signal and providing a regulated DC voltage and for receiving said pin diode current and providing a stabilizing voltage based on said pin diode current whereby said stabilizing voltage varies with said pin diode current and thus said laser diode output and thus said temperature of said laser diode;
   an optical power regulator for producing a laser diode current based on the regulated DC voltage and said stabilizing voltage, said laser diode current varying with said stabilizing voltage, and thus said pin diode current, and thus said laser diode output and thus said laser diode temperature;
   an amplifier biased by said laser diode current for passing said laser diode current to said laser diode to thereby drive said laser diode and for receiving an RF signal and passing an amplified RF signal to said laser diode to thereby modulate said laser diode,
   wherein said laser diode current, said pin diode current and said stabilizing voltage vary with the temperature of the laser diode such that the laser diode output power remains constant,
   whereby said fiber optic link has a low noise figure, a high spurious free dynamic range and a low operating power.

2. The fiber optic link of claim 1 wherein said fiber optic transmitter has an operating current less than about 50 milliamps.

3. The fiber optic link of claim 2 wherein the noise figure of said fiber optic link is less than about 2.5 dB.

4. The fiber optic link of claim 1 wherein said fiber optic transmitter has an operating current between about 35 and 50 milliamps.

5. The fiber optic link of claim 4 wherein said fiber optic transmitter has an operating voltage at about 4.2 V.

6. The fiber optic link of claim 1 wherein said fiber optic link has a spurious free dynamic range greater than about 70 dB/MHz.

7. The fiber optic link of claim 1 wherein said optical power converter comprises a gallium arsenide photocell array.

8. The fiber optic link of claim 7 wherein the end of said fiber optic power cable connected to said optical power converter is angle polished.

9. The fiber optic link of claim 1 wherein said reference circuit comprises:
   an operational amplifier for producing an output voltage at an output terminal;
   a stabilizing resistor connected to said output terminal for receiving said pin diode current to thereby provide a voltage across said stabilizing resistor; and
   a source resistor connected to said output terminal for providing a regulated DC voltage.

10. The fiber optic link of claim 9 wherein said stabilizing voltage is said output voltage less the voltage across said stabilizing resistor.

11. The fiber optic link of claim 9 wherein said stabilizing resistor is 1.25 divided by the value of said pin diode current at a selected maximum laser diode output power.

12. The fiber optic link of claim 9 wherein said output voltage is −2.5 v and said regulated DC voltage is less than said output voltage.

13. The fiber optic link of claim 1 wherein said optical power regulator comprises:
   a second operational amplifier having said stabilizing voltage at an inverting terminal and said regulated DC voltage at a noninverting terminal and providing a laser diode current for driving the laser diode whereby said laser diode current is driven up until the stabilizing voltage equals the regulated DC voltage.

14. The fiber optic link of claim 1 wherein said amplifier has less than about 1 dB gain variation and tilt.

15. The fiber optic link of claim 1 wherein said amplifier is comprises:
   a first amplifier stage for receiving said RF signal and producing a first amplified RF signal, said first amplifier stage having a transistor with a 20 dB gain, a noise figure less than about 2 dB, a gain variation tilt less than about 0.5 dB and a collector current greater than a third order intercept current; and
   a second amplifier stage for receiving said first amplified RF signal and for producing a second amplified RF signal, said second amplifier stage having a transistor that is biased with said laser diode current and that has a gain of about 15 dB.

16. The fiber optic link of claim 15 wherein the overall operating current of said fiber optic transmitter is less than about 50 ma.

17. The fiber optic link of claim 1 wherein said amplifier comprises;
   a single amplifier stage having a single transistor;
   a collector impedance matching network for matching the impedance of the transistor collector with the impedance of the laser diode to thereby maximize the RF gain of the amplifier; and
   a base impedance matching network for matching the impedance of the transistor base with the impedance of the source to thereby maximize the RF gain of the amplifier.

18. The fiber optic link of claim 17 wherein said collector impedance matching network comprises:
   a first shunt capacitor having a first terminal connected to ground and a second terminal connected to the transistor collector and a first terminal of a series inductor, and
   a second shunt capacitor having a first terminal connected to ground and a second terminal connected to a second terminal of said series inductor and said laser diode.

19. The fiber optic link of claim 18 wherein said first shunt capacitor has a value between about 0.5 and 2 picofarads, said second shunt capacitor has a value between about 2 and 6 picofarads and said series inductor has a value of about 90 nanohenries (nH).

20. The fiber optic link of claim 17 where the overall operating current of said fiber optic transmitter is less than about 35 mA.

21. A fiber optic link having a fiber optic transmitter and a fiber optic receiver, said fiber optic transmitter comprising:
   a laser diode module having a laser diode for transmitting a modulated laser signal over a fiber optic cable and a pin monitor diode for monitoring the output power of said laser diode and producing a pin diode current proportional to the laser diode output power;
   a power regulator for receiving a DC optical power signal and providing a laser diode current based on said pin monitor current; and
   an amplifier having one or more amplifier stages for receiving an RF signal and providing an amplified RF signal to said laser diode for modulating said laser diode, and for passing said laser diode current to said laser diode;
   said fiber optic transmitter having an operating current between about 35 and 50 MA with an operating voltage at less than about 4.2 V.

22. The fiber optic link of claim 21 wherein said fiber optic link has a spurious free dynamic range greater than about 70 dB/MHz.

23. The fiber optic link of claim 21 wherein said fiber optic link has a noise figure less than about 2.4 dB.

* * * * *